United States Patent [19]

Crouch et al.

[11] 4,327,679
[45] May 4, 1982

[54] I.C. ENGINES

[75] Inventors: Alan R. Crouch, Worthing; Samuel Lesley, Shoreham-by-Sea, both of England

[73] Assignee: Ricardo Consulting Engineers Limited, Shoreham-by-Sea, England

[21] Appl. No.: 43,893

[22] Filed: May 30, 1979

[30] Foreign Application Priority Data

May 31, 1978 [GB] United Kingdom ............... 25114/78

[51] Int. Cl.³ .............................................. F02B 77/00
[52] U.S. Cl. ............................. 123/195 R; 123/195 C; 180/291; 248/659
[58] Field of Search ........... 123/195 R, 195 A, 195 C, 123/198 E; 180/291, 292; 248/659

[56] References Cited

U.S. PATENT DOCUMENTS

| 1,746,223 | 2/1930 | Mueller | 180/291 |
| 2,165,750 | 7/1939 | Gardner et al. | 248/610 |
| 3,769,953 | 11/1973 | Kuhn | 123/195 R |
| 3,880,134 | 4/1975 | Thien et al. | 123/195 C |

FOREIGN PATENT DOCUMENTS

| 2159158 | 6/1973 | Fed. Rep. of Germany . |
| 2739944 | 3/1979 | Fed. Rep. of Germany ... 123/195 C |
| 1566649 | 5/1969 | France . |
| 2205107 | 5/1974 | France . |
| 581600 | 10/1946 | United Kingdom . |

Primary Examiner—Craig R. Feinberg
Attorney, Agent, or Firm—Cushman, Darby & Cushman

[57] ABSTRACT

A reciprocating-piston i.c. engine is supported on a supporting structure by means of mountings which are attached, not to the crankcase wall, but to the main bearing structure of the engine, by means of rigid support members which extend through flexibly-sealed apertures in the crankcase wall and are rigidly secured to the main bearing blocks. The crankcase wall is thus isolated from vibrations generated by internal moving parts of the engine, and the deformations of the crankcase by such vibrations, and hence the level of noise generated by the crankcase wall, are reduced. Where a longitudinal stiffening beam is secured to the bottom bearing blocks of the main bearing structure, some of the rigid supports of the mountings may be attached to the stiffening beam.

13 Claims, 10 Drawing Figures

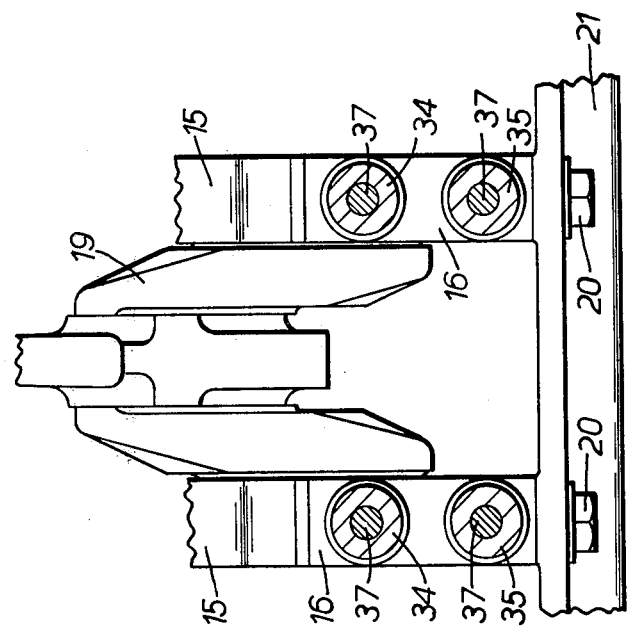
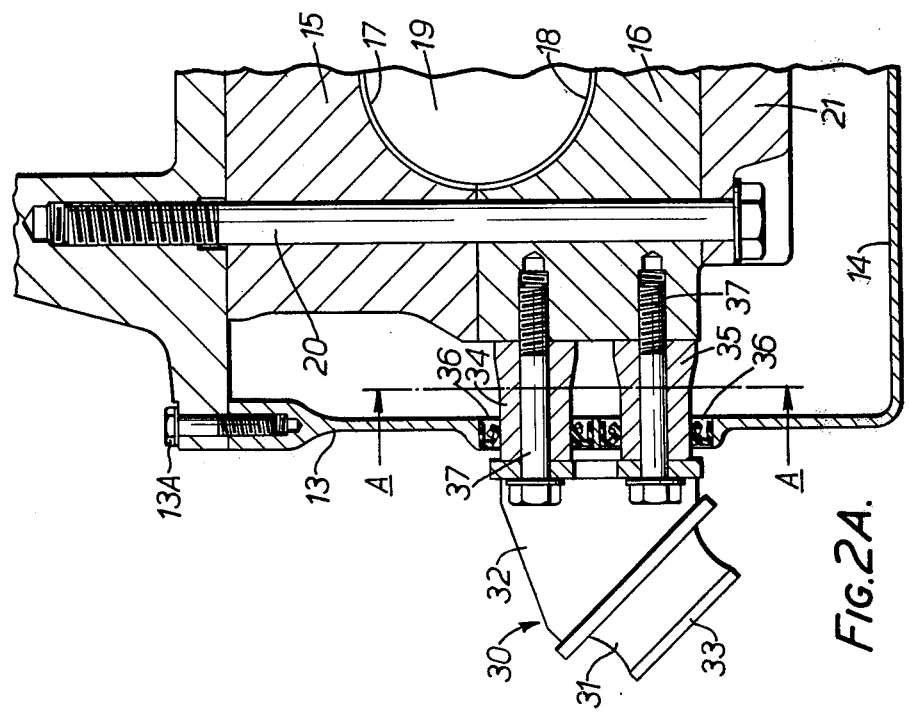

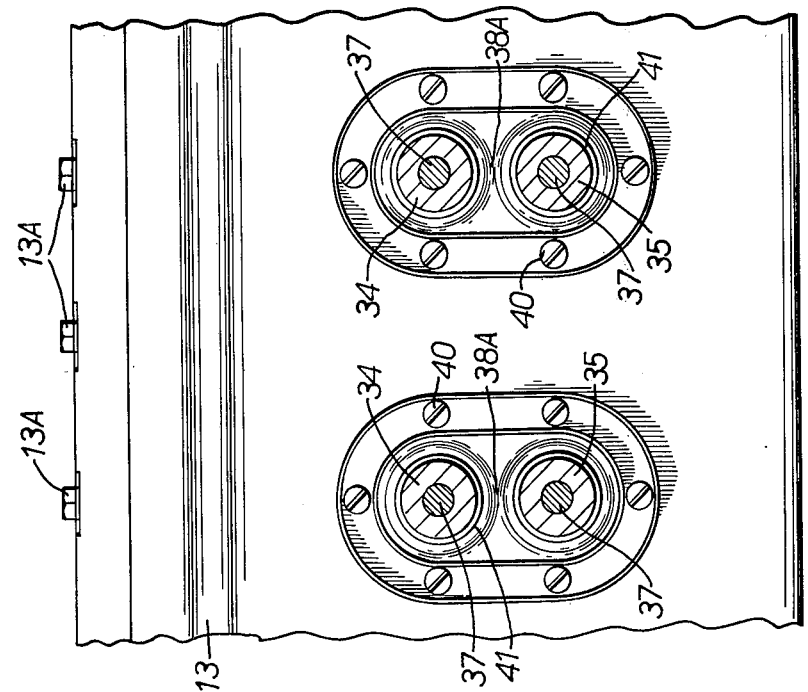
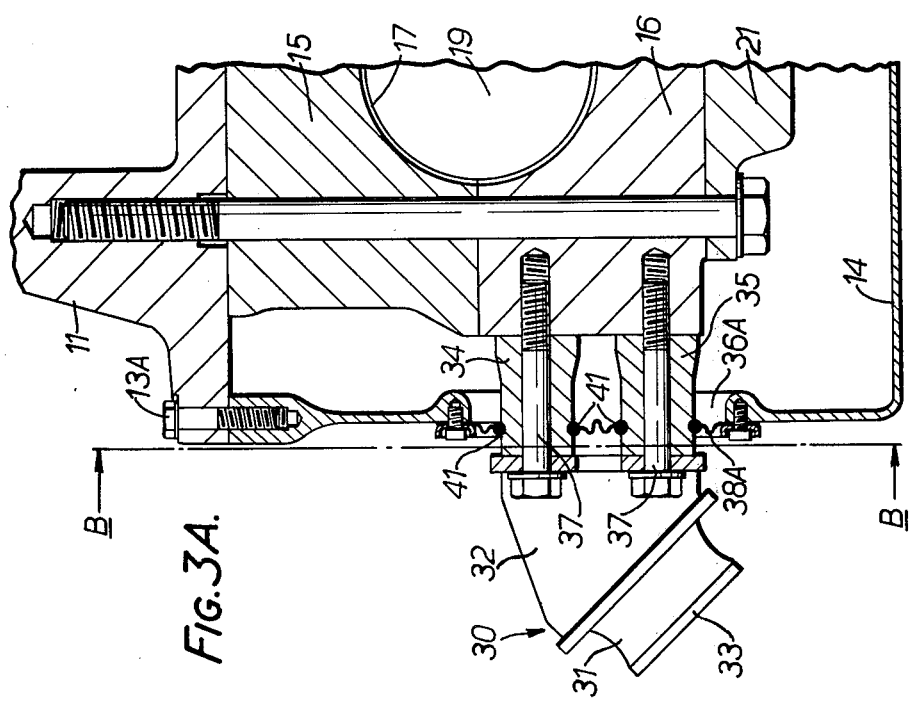

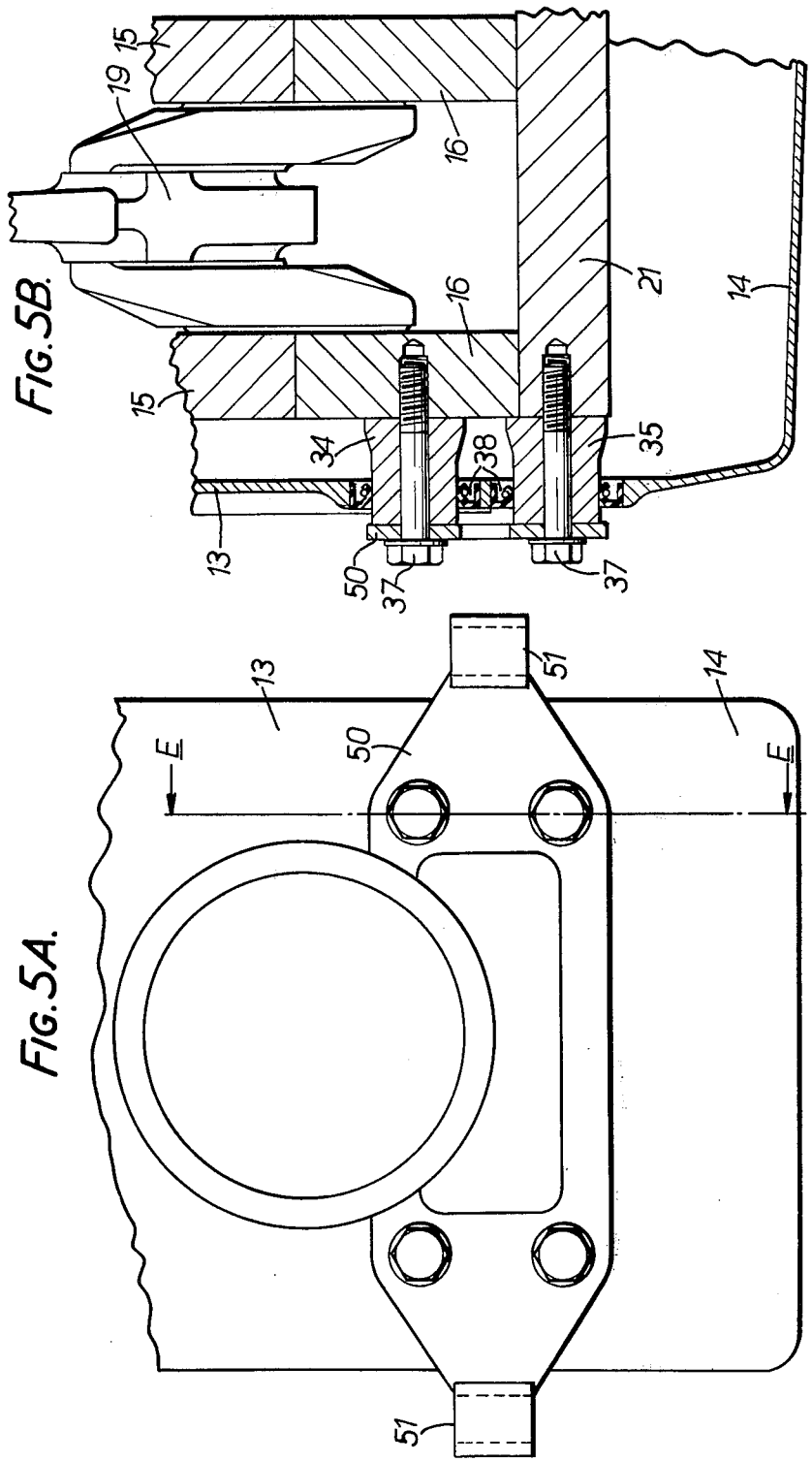

I.C. ENGINES

BACKGROUND OF THE INVENTION

This invention relates to I.C. engines of the reciprocating-piston type, and is concerned with reducing the level of noise generated by such engines in use. The invention is applicable primarily to automobile engines, although it may also be applied over the whole range of stationary and marine piston engines and even aircraft piston engines.

Overall, considerable reductions in the noise emission levels of piston engines have been achieved by reducing that part of the noise due to the entry of the air used by the engine together with that part due to the release of the exhaust gases to atmosphere via a silenced exhaust pipe system. However, due to the logarithmic nature of the laws governing noise, even when the noise from these two sources has been subtracted from the total there still remains a significant noise level generated by the sum of all the exterior surface movements of the engine, which acts as a three-dimensional loudspeaker diaphragm and puts energy into the surrounding air which the human ear recognises as noise. The resultant wave form of the noise from this source is a complex one having many components of different frequencies, amplitudes and phases derived from the natural frequencies of all the various surfaces and panels, etc. on the exterior of the engine excited by the complex deflections within the load-carrying structure of the engine as a result of the compounded gas and inertia loads imposed on the engine piston and reacted by the cylinder head and cylinder walls.

Many proposals have been made for reducing these noise-generating exterior micromovements of the engine, such as the use of ribbed panels to raise natural frequencies and reduce local amplitudes, and the use of attached exterior panels including elastically-bonded outer panels in which the elastomer itself has a high damping characteristic. In general terms it is necessary to divorce or decouple the outside panels of an engine to the greatest possible extent if movements and resonances, disliked by the ear as noise, are to be avoided.

The present invention approaches the problem of noise reduction by seeking to divorce the large-area crankcase skirt and sump of a piston engine as totally as is practicable from the reaction loads at the engine mounting points, so as to reduce the deflections of these large-area external surfaces under such loads and hence to reduce the generation of radiated noise by them.

It is usual to mount automotive and other piston-type engines on flexible mountings designed to produce low natural frequencies of vibration for the supported engine mass in all modes, thus providing a high degree of isolation of the vehicle chassis or body from unpleasant disturbing vibrations emanating from the engine. In automobiles it is usual to mount the engine and gearbox as a unitary assembly using a single, or sometimes a twin, flexible mounting at the rear of the gearbox and two front flexible mountings attached to the engine crankcase skirt, one on either side of the engine, usually slightly below the crankshaft longitudinal axis, and often approximately midway along the engine length. With existing automotive engines suitable machined pads are provided on and integral with the external crankcase walls, and appropriate flexible mountings, usually of the rubber block type, are bolted to these pads, the lower mounting flanges of the mountings being bolted to the vehicle chassis or body. A very wide range of variation in the design and positioning of these engine mountings is known, but in all cases known to the applicant the engine sides of such mountings are solidly bolted to pads or brackets which are an integral part of the external surface of the engine crankcase or other structure. As a consequence, reacting dynamic forces and couples are transmitted through the external shell of the engine structure, which will as a result deform and possibly resonate, and will emit noise to the surroundings.

BRIEF SUMMARY OF THE INVENTION

According to the present invention, at least one of the flexible mountings which support a reciprocating-piston i.c. engine unit is attached to the engine unit by means of one or more rigid supports which extend through one or more over-size flexibly-sealed apertures in the crankcase wall and are rigidly secured to the main bearing structure which is secured to the cylinder block and in which the crankshaft is journalled.

For example the or each such attachment may be directly secured to the backing member of the lower or upper half of a main bearing; for example where two adjacent name bearings are spanned by a single engine mounting, that mounting may have two such attachments secured to the backing members of the adjacent main bearings. Where a stiffening beam is secured longitudinally to the bottoms of all the lower main bearing caps and interconnects them, the attachments or at least one of them may be rigidly secured to the stiffening beam, instead of or in addition to being secured to a main bearing backing member.

The attachments for the engine mountings may take the form of securing bolts extending through bores formed in rigid compression members, the bolts being screwed into tapped holes in the respective main bearing members or stiffening beam as the case may be.

It will be appreciated that by the use of engine mountings whose attachments to the engine are secured to the main bearing structure as indicated, the reaction effects of dynamic forces occurring within the engine are effectively isolated from the crankcase wall, thus avoiding the generation of movements of the external surface of the crankcase wall due to its deflection under such reaction forces, and avoiding any resultant vibratory and noise-producing resonances in the crankcase wall.

DESCRIPTION OF THE DRAWINGS

The invention may be carried into practice in various ways, but certain specific embodiments will now be described by way of example only and with reference to the accompanying drawings in which:

FIG. 2A is a transverse half-section through the lower part of the engine of FIGS. 1A and 1B, FIG. 2B is a view in section on the line A—A in FIG. 2A, FIG. 3A is a view similar to FIG. 2A of a modified arrangement, FIG. 3B is a view in section on the line B—B in FIG. 3A, FIG. 5A is a front elevation of the lower part of an engine unit having a single front flexible mounting and FIG. 5B is a view in section on the line E—E of FIG. 5A.

DETAILED DESCRIPTION OF THE EXAMPLES

Figure 1A:
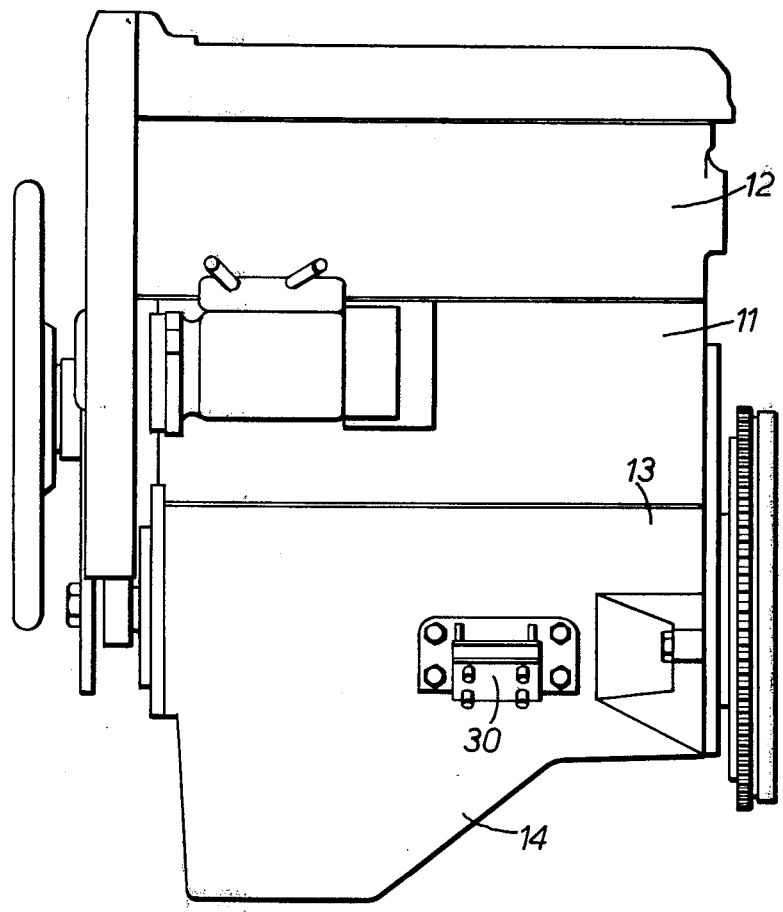
FIGS. 1A and 1B are respectively a side elevation and a front elevation of an automobile engine unit having a flexible mounting on either side.

In the embodiment of the invention shown in FIGS. 1A, 1B, 2A and 2B, the engine unit 10 will in use form part of a complete engine/gearbox assembly, the gearbox (not shown) being secured to or integrated with the rear end of the engine. The engine cylinder block is shown at 11 surmounted by the cylinder head 12, and a crankcase 13 provided with an integral sump 14 is secured to the secured to the bottom of the cylinder block 11 by setscrews 13A (FIG. 2A).

Following good modern practice the upper part of the engine, which for structural purposes comprises chiefly the cylinder block 11, is made as stiff as possible, the cylinder head gas loads being transmitted via the cylinder head securing studs in as straight lines as is practicable to the lower part of the cylinder block, whence the upward gas loads are passed on to the main bearing structure where they react with the downward forces originating from the downward gas loads on the pistons. The transmission of the forces through the cylinder block 11 is through internal structural members (not shown) some of which are linked with triangulated ribbing. Light non-load-carrying panels, made for example of twin-layered steel with a vibration-damping plastics interlayer, are applied to the exterior of the cylinder block structure to enclose it for sound-damping purposes. The cylinder block is cast in cast iron or light alloy, or may be die-cast in light alloy.

The main bearing structure secured to the bottom of the cylinder block comprises upper and half-bearing blocks 15 and lower bearing caps 16 of cast iron or steel, which comprise the backing members for the bearing shells 17, 18 of the main bearings of the crankshaft 19. The bearing blocks and caps 15 and 16 are tightened together and attached to the under side of the cylinder block 11 by setscrews 20 and/or through-studs screwed into the cylinder block. If desired, each upper bearing block 15 could be bolted individually to the cylinder block 11, and the lower bearing cap 16 then bolted to the upper block. To improve the transverse stiffness of the main bearings a common longitudinal stiffening beam 21 is bolted to the all lower bearing caps by the setscrews 20, to interconnect the main bearings along the length of the engine, in accordance with our U.S. Pat. No. 3,841,203. The beam 21 also helps to stiffen the whole engine structure. If the cylinder block is made of light alloy the longitudinal beam 21 should also be made of light alloy to reduce distortion due to longitudinal differential thermal expansion in the whole engine structure. The beam 21 should be of cast iron or steel if the cylinder block is of cast iron.

Figure 1B:
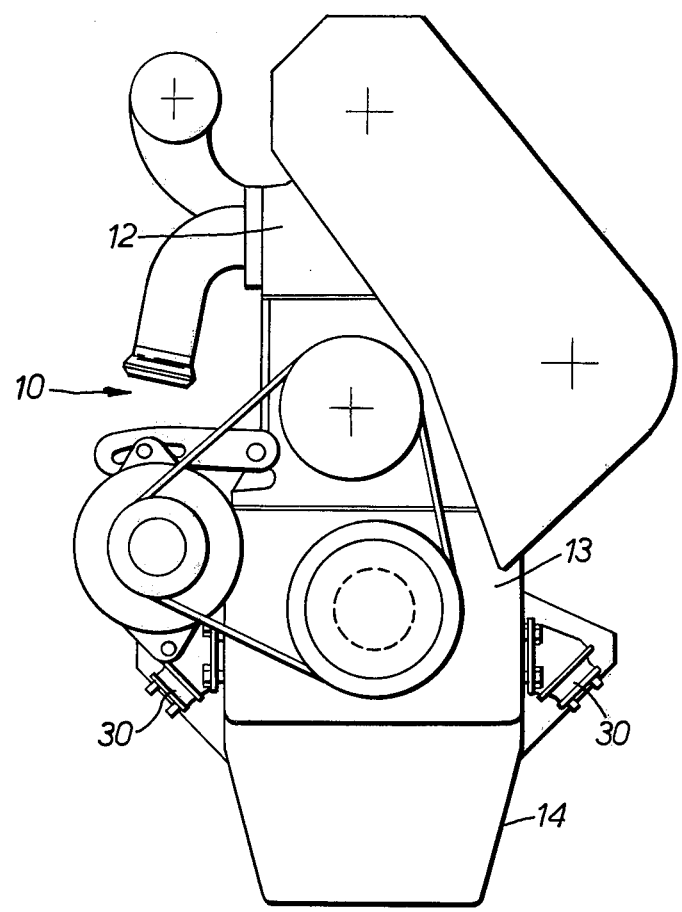

The engine 10 is provided with two flexible mountings 30 positioned one on either side as shown in FIGS. 1A and 1B. A further flexible mounting or mountings (not shown) would also be provided at the rear of the gearbox to support the whole engine/gearbox assembly as an integral assembly. Each flexible mounting 30 comprises for example an inclined block 31 of rubber bonded to upper and lower flange plate members 32,33, of which the lower plate 33 is to be bolted to the vehicle chassis or body structure. The vertical and horizontal stiffnesses of the rubber blocks 31, together with those of the rear flexible mounting(s) of the gearbox, are chosen in accordance with well-established techniques in relation to their positioning and angle of inclination to be strong enough to resist the maximum dynamic out-of-balance forces and torque reaction of the engine 10, and also to provide low natural frequencies of vibration of the suspended engine mass for all six possible modes of engine vibration, thus providing a high degree of isolation of the chassis and vehicle body from engine vibration.

The upper flange plate member 32 of each flexible mounting 30 comprises a bracket which is secured, not to the side wall of the crankcase 13, but to the lower main bearing caps 16 of two main bearings which are spanned by the flange plate bracket 32, by means of two setscrews 37 which extend through the bores of two pairs of tubular compression/spacer members 34, 35 which extend through respective oversize circular openings 36 in the side wall of the crankcase 13. The setscrews are screwed into tapped holes in the sides of the bearing caps 16. The compression/spacer members 34, 35 are sealed resiliently to the edges of the apertures 36 in the crankcase wall (which is deep and may be ribbed) by annular lip-type oil seals 38 which provide radial flexibility as well as the required oil sealing. The reaction forces at the flexible mountings are transferred to the main bearing structure through the compression/spacer members 34,35 and set screws 37. Thus the crankcase 13 is effectively isolated from reaction forces due to dynamic forces and couples within the engine 10, whilst being effectively sealed around the members 34, 36 by the oil seals 38 to retain lubricating oil within the crankcase. In this way the setting up of external noise-generating movements of the crankcase wall or skirt 13 by the reactions at the flexible mountings, and the possible excitation of vibratory, noise-producing resonances in the wall 13, is avoided. As shown, with this design it is possible to use a deep crankcase 13 with an integral sump 14.

To assemble the lower part of the engine, the tubular compression/spacer members 34,35 are inserted through the sealing rings 38 from the inside of the crankcase 13 with the latter detached from the cylinder block, and are pushed further through the seals 38 than their final axial positions. The crankcase 13 is then bolted up to the under side of the cylinder block 11 by the setscrews 13A. Next the setscrews 37 are inserted through the holes in the upper mounting brackets 32 and are pushed through the bores of the compression/spacer members 34,35, the latter are pushed back through the oil seals 38 into abutment with the lower main bearing caps 16, and the setscrews 37 are tightened into the tapped holes in the bearing caps 16.

FIGS. 3A and 3B show an engine similar to that of FIGS. 1A, 1B, 2A and 2B and with two similar flexible mountings 30 similarly secured to the lower main bearing cap 16. In this case however a diaphragm type of flexible oil seal 38A is used. The two setscrews 37 which are screwed into each lower bearing cap 16 both extend through a single, larger aperture 36A in the side wall of the crankcase 13, and the peripheral margin of each diaphragm seal 38A is secured by screws 40 to the edge of the respective aperture 36A. The two compression/spacer members 34, 35 extend through circular holes in each diaphragm seal, these holes having lips 41 which resiliently grip around the compression/spacer members.

Other kinds of elastomeric oil seals may also be employed, provided they have high radial flexibility.

Figure 4B:
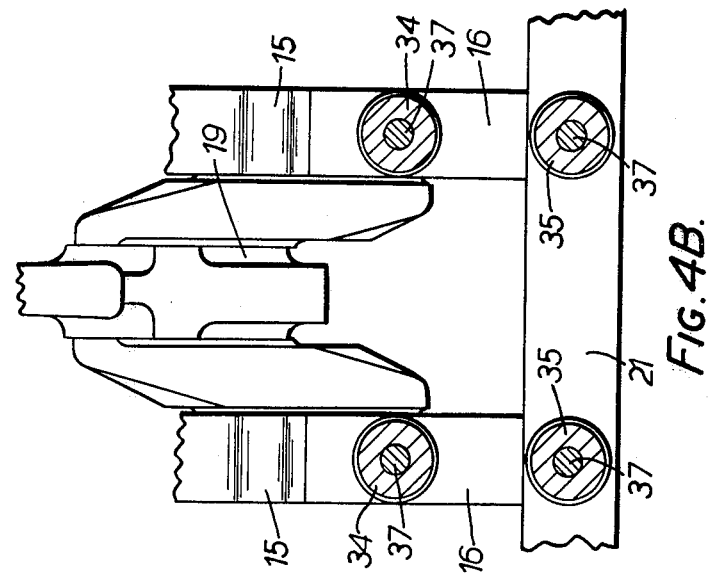
FIG. 4B is a view in section on the line C—C in FIG. 4A.
Figure 4A:
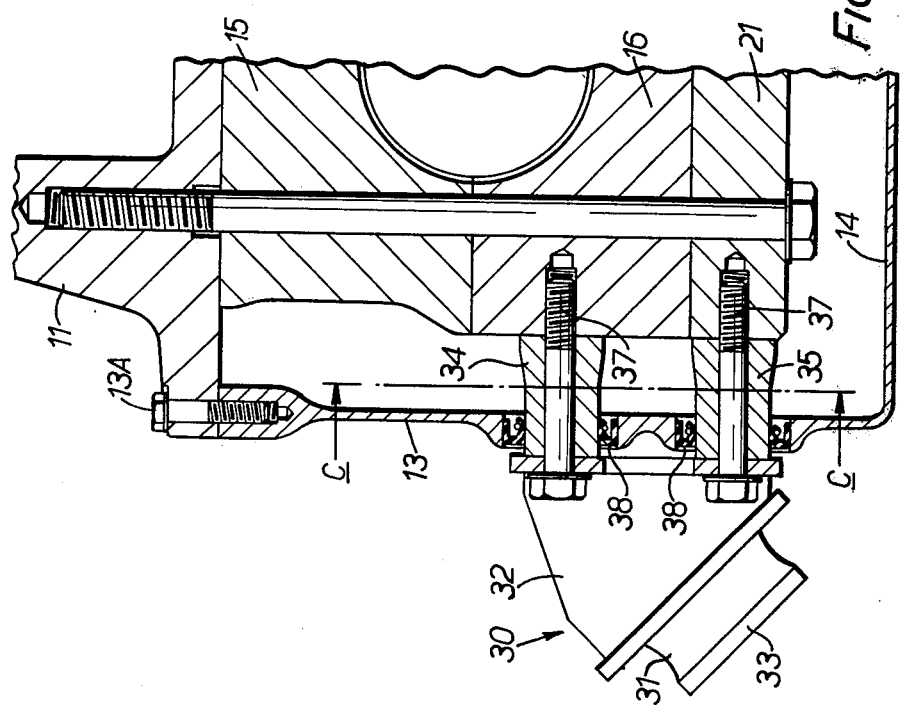
FIG. 4A is a view similar to FIG. 2A showing another modification.

In the embodiment shown in FIGS. 4A and 4B the details of the engine 10 and the general construction and arrangement of the two flexible mountings 30 are all similar to those of the embodiment of FIGS. 1A, 1B, 2A and 2B, and the same reference numerals will once again be used to denote similar parts. In this case however, whilst the upper setscrew 37 is screwed into the respective lower main bearing cap 16 as before, the setscrew 37 associated with each lower compression/spacer member 35 is screwed into a tapped hole in the edge of the stiffening beam 21. Each bearing bracket 32 spans two adjacent main bearings, as before.

If more exacting machining requirements can be accepted, it is also possible to tap the upper setscrews 37 associated with the upper compression/spacer members 34 into the upper main bearing blocks 15, and the lower setscrews 37 into the lower main bearing caps 16, or into the stiffening beam 21 if preferred.

Finally, the embodiment of FIGS. 5A and 5B is a design suitable for those cases where it is desired to have a front flexible mounting arrangement for the engine 10. This arrangement would normally require the fitting in addition of two rear mountings, either on the flywheel bell housing or further back on the gearbox. As shown, a single upper mounting plate 50 is bolted through the front of the crankcase wall 13 by means of two pairs of setscrews 37 and compression/spacer members 34, 35. The setscrews 37 are threaded into tapped holes respectively in the front face of the lower bearing cap 16 of the front main bearing and in the front end of the stiffening beam 21. The single upper mounting plate 50 has mounting collars 51 at opposite ends, and separate flexible mounting blocks of appropriate design are attached to these collars to support the engine resiliently on opposite sides at its front end.

It is possible to adapt the arrangements of any of the illustrated embodiments to the mounting of large marine engines which are normally supported at multiple mounting points along the length of the engine. It will be appreciated that each of FIGS. 2A, 3A and 4A shows in section only one half of the engine and one flexible mounting on that one side of the engine, and that the arrangement of the opposite half of the engine and its mounting are similar.

Instead of separate compression/spacer members 34 and 35, it would be possible to use a single member in the form of a backing plate with two integral spigots protruding from it, one such single member being bolted to the main bearing structure at each main bearing in one of the several ways described by means of set screws 37 passed through the bores of the integral spigots and through the backing plate.

It is also possible in the embodiments of FIGS. 2A, 2B and 3A, 3B for each of the setscrews 37, or at least the upper setscrew 37 of each pair, to be screwed into a tapped hole in the upper bearing block 15 instead of in the lower bearing cap 16.

What we claim as our invention and desire to secure by Letters Patent is:

1. A reciprocating-piston internal combustion engine having a cylinder block, a crankcase mounted beneath the cylinder block, the crankcase having a depending peripheral wall, and a rotary crankshaft journalled in a main bearing structure secured to the underside of the cylinder block within the crankcase, a portion of said bearing structure being spaced from said crankcase wall to form a gap between them, the engine being supported by at least one engine mounting on a supporting structure, said mounting being attached to the engine by at least one rigid support, said rigid support extending through an oversize flexibly-sealed aperture in the wall of the crankcase and across said gap and being rigidly secured to said portion of the main bearing structure, wherein said crankcase wall being isolated from dynamic reaction loads generated at said mounting by the engine in operation due to the crankcase wall being free from direct contact with said rigid support and said engine mounting.

2. An engine as claimed in claim 1 in which the main bearing structure comprises a plurality of pairs of cooperating upper and lower backing members supported by the cylinder block, each said pair accommodating between them main bearing shells for the crankshaft, and in which said rigid support of the said one mounting of the engine is directly secured rigidly to one of the backing members.

3. An engine as claimed in claim 2, in which the said one mounting has at least two rigid supports secured to said one of the backing members.

4. An engine as claimed in claim 2 or claim 3, in which each rigid support for the said one mounting comprises a rigid spacer member formed with a bore and a securing bolt which extends through said bore and is screwed into a tapped hole in the backing member.

5. An engine as claimed in claim 1 in which the said main bearing structure comprises a plurality of pairs of cooperating upper and lower backing members, each said pair being secured to the cylinder block and accommodating between them main bearing shells for the crankshaft, and in which the main bearing structure includes a stiffening beam secured longitudinally to the bottoms of the lower backing members to interconnect them, and in which at least one rigid support of the said one mounting of the engine is directly secured rigidly to the stiffening beam.

6. An engine as claimed in claim 5, in which the said support for the said one mounting comprises a rigid spacer member formed with a bore, and a securing bolt which extends through the bore and is screwed into a tapped hole in the stiffening beam.

7. An engine as claimed in claim 6, in which the said one mounting has at least one further support comprising a rigid spacer member formed with a bore and a securing bolt which extends through the bore and is screwed into a tapped hole in one of the backing members.

8. An engine as claimed in any one of claims 1 to 3, 5, 6 or 7, in which each rigid support extends through an individual oversize aperture in the crankcase wall and is free from direct contact therewith and is sealed to the edges of its hole by means of an associated resilient sealing ring having a lip which embraces and resiliently seals around the support.

9. An engine as claimed in any one of claims 1 to 3, 5, 6 or 7, in which at least two rigid supports of the said one mounting extend through a common oversize aperture in the crankcase wall being free from direct contact therewith and are sealed to the edges thereof by means of a common resilient oil seal diaphragm, the seal diaphragm having holes through which the supports respectively extend, which holes have lips which respectively embrace and resiliently seal around the respective supports.

10. An engine as claimed in any one of claims 1 to 3, 5, 6 or 7 having at least one of the said mountings on each of its sides with each rigid support thereof secured to the main bearing structure.

11. An engine as claimed in claim 10 including at least two adjacent main bearings and in which each of the said mountings has an upper rigid mounting bracket which spans the adjacent main bearings of the crankshaft, the bracket being secured by separate rigid supports to backing members of the respective adjacent main bearings.

12. An engine as claimed in any one of claims 1 to 3, 5, 6 or 7 having a front end, and having the said one mounting at the front end.

13. An engine as claimed in claim 12 having a front end and a rear end, in combination with a gearbox secured to the rear end of the engine, the said combination being supported by further mountings adjacent to the rear end of the engine, and said further mountings being directly attached to the said combination at points remote from the crankcase wall.

* * * * *